US011353681B2

(12) United States Patent
Heiser et al.

(10) Patent No.: US 11,353,681 B2
(45) Date of Patent: Jun. 7, 2022

(54) OBJECTIVE LENS MOUNT AND CONNECTION DEVICE FOR REPLACEABLE MOUNTING OF AN OBJECTIVE LENS

(71) Applicant: Carl Mahr Holding GmbH, Goettingen (DE)

(72) Inventors: Lars Heiser, Jena (DE); Markus Lotz, Apolda (DE)

(73) Assignee: Carl Mahr Holding GmbH, Goettingen (DE)

( * ) Notice: Subject to any disclaimer, the term of this patent is extended or adjusted under 35 U.S.C. 154(b) by 239 days.

(21) Appl. No.: 16/700,392

(22) Filed: Dec. 2, 2019

(65) Prior Publication Data

US 2020/0174221 A1 Jun. 4, 2020

(30) Foreign Application Priority Data

Dec. 3, 2018 (DE) ...................... 10 2018 130 629.6

(51) Int. Cl.
*G02B 7/02* (2021.01)
*G02B 7/14* (2021.01)

(52) U.S. Cl.
CPC ..................................... *G02B 7/14* (2013.01)

(58) Field of Classification Search
CPC ...................................................... G02B 7/14
USPC ......................................... 359/811, 819, 827
See application file for complete search history.

(56) References Cited

U.S. PATENT DOCUMENTS 2,794,360 A 6/1957 Eagle
3,906,534 A 9/1975 Shirasaki
4,281,895 A 8/1981 Mohr
4,302,077 A 11/1981 Sato et al.
4,596,454 A 6/1986 Kawai et al.
(Continued)

FOREIGN PATENT DOCUMENTS

DE 102006022049 A1 11/2007
DE 19702499 B4 10/2008
(Continued)

OTHER PUBLICATIONS

British Office Action and Search Report dated May 13, 2020, in corresponding British Application No. GB1916666.9 (8 pages).
(Continued)

*Primary Examiner* — William Choi
(74) *Attorney, Agent, or Firm* — Fitch, Even, Tabin & Flannery LLP

(57) ABSTRACT

An objective lens mount and a connection device are releasably connected. The connection device is part of an objective lens or an adapter. The objective lens mount has at least one abutment surface that cooperates with at least one counter abutment surface at the connection device. At least two V-shaped first positioning bodies with at least one positioning surface are arranged such that the positioning surfaces face the longitudinal axis. At least one counter positioning surface at the connection device abuts the positioning surfaces of the objective lens mount. The relative position in the circumferential direction is defined via a rotation stop of the objective lens mount that cooperates with a counter rotation stop of the connection device. A locking device retains the connection device at the objective lens mount and effects a force component in the axial direction and preferably a force component in circumferential direction.

19 Claims, 10 Drawing Sheets

(56) References Cited

U.S. PATENT DOCUMENTS

| | | | |
|---|---|---|---|
| 4,659,203 A | 4/1987 | Niwa et al. |
| 5,262,899 A | 11/1993 | Iizuka |
| 5,455,711 A | 10/1995 | Palmer |
| 5,765,049 A | 6/1998 | Hase et al. |
| 6,443,626 B1 | 9/2002 | Foster |
| 6,538,747 B1 | 3/2003 | Arnold |
| 7,061,698 B2 | 6/2006 | Osterried et al. |
| 7,379,112 B1 | 5/2008 | Raad |
| 10,281,802 B2 | 5/2019 | Chiang |
| 2013/0265662 A1 | 10/2013 | Araie et al. |

FOREIGN PATENT DOCUMENTS

| | | |
|---|---|---|
| EP | 2725417 A1 | 4/2014 |
| JP | 2013235070 A | 11/2013 |
| JP | 2016170344 A | 9/2016 |

OTHER PUBLICATIONS

German Office Action dated Sep. 4, 2019, in corresponding German Application No. 10 2018 130 629.6, with machine English translation (16 pages).

GPI XP/D GPI FlashPhase Interferometer Operating Manual OMP-0502C, Jul. 2006, Zygo Corporation, Middlefield, Connecticut (62 pages).

OBJECTIVE LENS MOUNT AND CONNECTION DEVICE FOR REPLACEABLE MOUNTING OF AN OBJECTIVE LENS

RELATED APPLICATION(S)

This application claims the benefit of German Patent Application No. 10 2018 130 629.6, filed Dec. 3, 2018, the contents of which is incorporated herein by reference as if fully rewritten herein.

TECHNICAL FIELD

The invention refers to an objective lens mount that is configured to be releaseably connected with a connection device of an objective lens. The connection device can be embodied as an adapter and can be releaseably connected with the objective lens or can be an unreleaseable part of the objective lens.

BACKGROUND

For connection of objective lenses with cameras threaded connections or bayonet joints are known.

U.S. Pat. No. 4,659,203 A describes a bayonet joint, wherein radially outward projecting bayonet projections are deposited at an objective lens mount and are inserted into grooves by a relative rotation. In doing so, the projections are overlapped in axial direction and the objective lens is connected with the objective lens mount. Additionally, spring elements are present at the projections of the objective lens in order to eliminate an axial play of the projections in the grooves.

The bayonet joint known from U.S. Pat. No. 2,794,360 A also comprises radial projections at the objective lens and grooves extending in circumferential direction at the objective lens mount. The projections are inserted into the grooves by twisting. The grooves are inclined in circumferential direction.

Additional bayonet joints of similar type are known from U.S. Pat. Nos. 7,379,112 B1, 4,281,895 A, 4,302,077 A, 6,443,626 B1, 5,262,899 A, 3,906,534 A.

The company Zygo Corporation offers an objective lens mount for an interferometer with a locking device at an abutment part that is described in the user manual for the interferometer (GPI XP/D® GPI FlashPhase® Interferometer Operating Manual) of the year 2006.

Electric contacts are present at the objective lens that is described in U.S. Pat. No. 4,596,454 A, wherein the contacts create an electric connection with respective counter contacts at the objective lens mount, when the objective lens is connected with the objective lens mount. For this an adapter is inserted between the rotatable objective lens and the objective lens mount of the camera that is non-rotatable arranged at the objective lens mount when replacing the objective lens.

Starting from the prior art it can be an object of the present invention to provide an objective lens mount and a connection device that are releaseably connectable with each other and that allow a precise and repeatable alignment of the objective lens relative to the objective lens mount.

SUMMARY

This object is solved by an objective lens mount, as well as a connection device as disclosed herein.

The invention refers to an objective lens mount, a connection device as well as a combination of the objective lens mount and the connection device. The connection device can be a non-removable part of the objective lens during usual handling of the objective lens or may form an adapter that serves as interface between the objective lens mount and a fixing means at the objective lens. During exchange of the objective lens the connection between the connection device and the objective lens mount is always released or established in order to achieve a repeatable exact positioning of the objective lens relative to the objective lens mount. Particularly the optic of the objective lens shall be repeatably exactly aligned relative to the optic of a camera or a measuring device—like for example an interferometer or another optical measuring device.

The objective lens mount is configured for exchangeably mounting of the connection device of the objective lens. It comprises an abutment part with at least one abutment surface. The abutment surface extends orthogonal to a longitudinal axis of the objective lens mount and is configured for abutment with respectively one associated counter abutment surface of the connection device. Due to the contact between one abutment surface and the associated counter abutment surface respectively, at least a relative position in axial direction parallel to the longitudinal axis is defined between the connection device and the abutment part.

Preferably a plurality of abutment surfaces is present wherein the abutment surfaces are distributed in a circumferential direction about the longitudinal axis are particularly arranged with distance to each other. It is alternatively also possible to provide a ring-shaped abutment surface that extends about the longitudinal axis. In such an embodiment, apart from the relative position in axial direction, additional degrees of freedom with regard to the relative position between the objective lens mount and the connection device can be eliminated, particularly tilting about one or more axes that are orientated orthogonal to the longitudinal axis.

Between one abutment surface and the assigned counter abutment surface respectively a plane-plane mating is preferably created. If a plurality of abutment surfaces is present, they extend in a plane orthogonal to the longitudinal axis respectively, preferably in one common plane orthogonal to the longitudinal axis.

The objective lens mount has additionally at least one positioning body pair with two positioning bodies arranged at a base part. The positioning bodies are arranged with distance to the longitudinal axis. Each positioning body has one positioning surface facing the longitudinal axis. By means of the positioning bodies, the relative position between the objective lens mount and the connection device is defined radial to the longitudinal axis.

In a radial plane with reference to the longitudinal axis the positioning surfaces of the positioning bodies of the same positioning body pair are orientated obliquely to each other. The positioning surfaces are orientated in the radial plane in a V-shaped manner with regard to each other so to speak. In such a radial plane an angle is included between the positioning surfaces that is larger than 0° and smaller than 180°. For example, the angle can have an amount of 60° to 120° and has an amount of 90° in an embodiment.

The positioning surfaces of the positioning bodies are configured for abutment with a respective counter positioning surface of the connection device respectively. In an embodiment the counter positioning surface can extend arc-shaped and preferably circular arc-shaped in circumferential direction about the longitudinal axis, if the connection of the objective lens mount with the connection device is established. In this case, when the connection with the connection device is established, the positioning surface can be orientated tangentially with regard to the counter positioning surface. In a preferred embodiment both positioning surfaces of the same positioning body pair are orientated tangentially to a common circle, wherein in the ideal case the center point of the circle is located on the longitudinal axis.

The positioning surface can be small in one or both dimensions, such that the positioning surface forms a positioning edge or a positioning point. This is for example the case, if the positioning surface is part of a cylinder skin surface or is part of a ball skin surface. The contact mating between the positioning surfaces and the counter positioning surfaces is preferably line-shaped in the direction of the longitudinal axis or point-shaped.

A line-shaped contact between two surfaces means a contact, in which the curvature of the surfaces abutting each other is identical (including zero) in one space direction and is different in the other space direction, e.g. if a cylinder abuts against a planar surface. A point-shaped contact between two surfaces means a contact, in which the curvature of the surfaces abutting each other is different in both space directions, e.g. if a ball abuts against a planar surface or if two cylinders with non-parallel orientated cylinder axes abut each other with their skin surfaces.

The radial relative position of the connection device and thus the objective lens relative to the objective lens mount is predefined by the contact between the positioning surfaces and the associated counter positioning surfaces of the connection device.

Additionally, a rotation stop is arranged at the base part of the objective lens mount. The rotation stop is configured for abutment with a counter rotation stop of the connection device, in order to define the relative position of the connection device or the objective lens in circumferential direction about the longitudinal axis. The rotation stop and/or the counter rotation stop can be respectively formed by a pin that is at least in portion cylindrical, for example. The contact between the rotation stop and the counter rotation stop can be line-shaped or point-shaped. A point-shaped contact is preferred.

The objective lens mount comprises additionally a locking device that has two locking parts that are arranged with distance to each other in circumferential direction and with distance to the longitudinal axis. Each locking part has a locking surface. The locking surfaces are configured to get into contact with respectively one counter locking surface of the connection device. The contact mating between the locking surfaces and the counter locking surfaces is preferably line-shaped or point-shaped.

The objective lens mount and/or the connection device can comprise a device for creating a pressure force between the rotation stop and the counter rotation stop in circumferential direction, when the connection between the objective lens mount and the connection device is established. For example, a magnet can be present at the rotation stop and/or the counter rotation stop in order to create such a pressure force. The pressure force can also be created by a spring or an elastically deformable body or may be created manually.

In a preferred embodiment each locking surface has an inclination in circumferential direction that is unequal to zero at the location that is configured for abutment with the counter locking surface. The optionally present inclination in circumferential direction is preferably linear, but can also be non-linear.

The locking device can be transferred in a locking condition. In this locking condition and particularly only when the objective lens mount is connected with the connection device, a force is created between the abutment part and the locking part in direction of the longitudinal axis. In doing so, a pressure force between the at least one abutment surface and the respective associated counter abutment surface is created, if the connection between the connection device and the objective lens mount is established.

This force can be transmitted into components in axial direction parallel to the longitudinal axis and in circumferential direction about the longitudinal axis, if the locking surfaces are inclined in circumferential direction. In doing so, pressure force between the at least one abutment surface and the respective associated counter abutment surface and also a pressure force between the rotation stop and the counter rotation stop in circumferential direction is created, if the connection between the connection device and the objective lens mount is established. Preferably the device for creating the pressure force in circumferential direction between the rotation stop and the counter rotation stop can thus be formed by the inclined locking surfaces. Alternatively, it is also possible that the counter locking surfaces are inclined in circumferential direction.

By means of the locking device the axial relative position parallel to the longitudinal axis and optionally the relative rotation position in circumferential direction about the longitudinal axis can thus be defined. With the separate locking device it is possible to adjust the force that acts in the locking condition in a way such that the pressure forces are equal with very small tolerances, also if the connection device or the objective lens is repeatedly attached and removed from the objective lens mount.

Thus, the relative position between the objective lens mount and the connection device can be defined in all degrees of freedom. The number of locked degrees of freedom by the contact matings between the objective lens mount and the connection device has an amount of at least six.

The abutment part with the at least one abutment surface, the base part and the positioning bodies with the positioning surfaces can be configured as separate components in a preferred embodiment. It is also possible that the base part and the abutment part are non-moveably, fixedly connected relative to each other or are embodied as an integral body, wherein the positioning bodies with the positioning surfaces can be configured as separate components.

In a preferred embodiment the locking device is configured to adjust and/or limit the force acting on the locking surfaces parallel to the longitudinal axis according to a specification, if the locking device is in the locking condition. The adjustment of the force can be pre-defined or limited, e.g. by mechanical means that limit an adjustment path of a force generating unit or a force generating means. Additionally or alternatively it is also possible to measure the force between the locking surfaces and the counter locking surfaces and/or between the at least one abutment surface and the at least one counter abutment surface and/or between the rotation stop and the counter rotation stop and to provide a control or feedback control of this force based on the measurement. For example, the measurement can be carried out by using respective force sensors, strain gauges, piezo sensors or the like.

In a preferred embodiment the locking device comprises a force generating unit with at least one spring. Particularly the spring is configured to create a force parallel to the longitudinal axis in the locking condition of the locking device, wherein the force acts between the locking surfaces and the counter locking surfaces, if the connection device is arranged at the objective lens mount. The force that can be generated by the at least one spring urges the locking surface preferably in direction toward the abutment surface.

The at least one spring can be a bending flexible spring. The at least one spring or bending flexible spring is preferably configured to create a force in the locking condition of the locking device acting onto both locking parts, in order to press the locking surfaces against the counter locking surfaces.

In an embodiment the bending flexible spring can be ring-shaped. For example, an operating element can be present, with which the bending flexible spring or the at least one spring of the force generating unit can be stressed or displaced in order to create the force and to switch the locking device into the locking condition. For example, the bending flexible spring can be moved between a non-deflected initial position and a bended position that is deflected compared with the initial position. The force generating unit with the at least one spring can be arranged symmetrically relative to the two locking parts. In doing so, the force generated by the at least one spring or bending flexible spring can be substantially regularly transferred on the two locking parts.

In a preferred embodiment the objective mounting device comprises an operating element. The locking device can be switched between the locking condition and a release condition that is different from the locking condition by means of the operating element. For example, the operating element can act upon the at least one spring of the force generating unit and can modify the force created by the at least one spring during the switching of the locking device between the locking condition and the release condition. Preferably the force applied on the locking parts by the force generating unit is very small or substantially equal to zero in the release condition.

The mounting or removing of the connection device at or from the objective lens mount is possible in the release condition of the locking device. On the contrary, the mounting and removing of the connection device at or from the objective lens mount is blocked in the locking condition.

In a preferred embodiment the locking parts of the locking device are moveably supported relative to the base part and/or the abutment part in axial direction parallel to the longitudinal axis. The movement in axial direction can be linear or can comprise another movement component obliquely or transverse to the axial direction. For example, the locking parts can be pivotably supported about an axis that extends orthogonal to the axial direction and is arranged with distance to the locking parts. In this embodiment the locking parts can carry out a movement at least in axial direction when the locking device is switched between the release condition and the locking condition.

Preferably each locking surface is defined by a portion of a cylinder skin surface. For example, a locking pin can be arranged at each locking part, wherein a respective locking surface is present at a skin surface of each locking pin. The locking pins can be separate bodies that are received or arranged in a locking support of the locking part. Thus, the locking support of the locking pins can be made from different materials.

Preferably a first positioning body pair has two first positioning bodies that are non-moveably positioned radial to the longitudinal axis. The non-moveable positioning means that the positioning bodies do not change their position when an objective lens is attached or removed. For initial calibration or adjustment of the objective lens mount, the positioning bodies can be moved orthogonal or radial to the longitudinal direction. During an objective lens exchange they remain in their adjusted or calibrated position.

The objective lens mount can additionally comprise a biasing device. The biasing device is arranged on the respective other side of a plane extending along the longitudinal axis compared with the first positioning body pair. The biasing device is configured to create a radial force on the connection device. In doing so, the counter positioning surfaces of the connection device can be urged against the positioning surfaces of the first positioning bodies.

In a preferred embodiment the biasing device comprises a second positioning body pair with two second positioning bodies. The second positioning bodies are moveably supported against biasing force orthogonal or radial to the longitudinal axis. The second positioning bodies can be moved relative to the longitudinal axis against the biasing force during an objective lens exchange.

Alternatively thereto the biasing device can only comprise one second positioning body that is moveably supported against the biasing force orthogonal or radial to the longitudinal axis.

It is preferred, if each positioning body comprises a positioning sleeve that is rotatably supported about a respective rotation axis. The positioning surface can be formed at the skin surface of the positioning sleeve. The rotation axis of the respective positioning sleeve is orientated orthogonal to the longitudinal axis. The rotation axes can be arranged tangentially with regard to a common circle about the longitudinal axis.

It is also preferred, if the base part is arranged at the abutment part or at another base body. An adjustment device can be present in order to position the base part of the base body relative to the abutment part. Particularly the base part can be moved in two space directions that are orientated orthogonal to each other (e.g. in two linear degrees of freedom) orthogonal to the longitudinal axis and relative to the abutment part. The abutment part can be non-moveably arranged relative to a housing of a measuring device, e.g. an interferometer. By moving of the base part relative to the abutment part, an optical axis of the objective lens can be aligned relative to the longitudinal axis of the objective lens mount and thus, for example, relative to an object of a camera, of an interferometer or a measuring device, such that the optical axis of the camera, the interferometer or the measuring device can be brought into alignment with the optical axis of the objective lens.

The base part has particularly a circular-shaped opening for receiving the objective lens and can be configured as a ring-shaped part for example. The abutment part and the base part can be connected with each other by the adjustment device to be adjustable relative to each other. If no adjustment device is present, the base part and the abutment part can be fixedly connected with each other or can be integrally formed without being adjustable or positionable relative to each other.

In a preferred embodiment the objective lens mount comprises a mechanical coding device. The mechanical coding device is configured to define a relative rotation section about the longitudinal axis between the objective lens mount and the connection device in which a connection, particularly a contact between the at least one abutment surface and the at least one counter abutment surface can be established. In doing so, it shall be particularly avoided that the connection device or the objective lens can be attached in several different rotational positions at the objective lens mount. Such a mechanical coding device can be formed by any non-symmetrical configuration in circumferential direction about the longitudinal axis, e.g. by means of a depression and/or a projection at the objective lens mount that cooperates with a respective depression or a respective projection at the connection device. The configuration of such a mechanical coding device is possible in various forms and dimensions.

The invention also refers to a connection device for an objective lens that is configured for exchangeably attaching the objective lens at the objective lens mount. As already explained, the connection device can be part of the objective lens or can be an adapter between the objective lens and the objective lens mount.

The connection device has at least one counter abutment surface arranged at a connection ring. The counter abutment surface is orientated orthogonal to an optical axis of the objective lens comprising a connection device or connected with a connection device and is configured for abutment with a respective abutment surface of the objective lens mount. In doing so, an axial relative position between the connection device or the objective lens and the objective lens mount can be defined.

The connection device has additionally at least one counter positioning surface. This counter positioning surface is arranged with distance to the optical axis of the objective lens and faces away from the optical axis. The at least one counter positioning surface is configured for abutment with one or more of the present positioning surfaces of the objective lens mount, in order to define a radial relative position of the objective lens or the connection device relative to the objective lens mount. The at least one counter positioning surface is preferably arranged at a connection ring and is formed in an embodiment by a ring surface extending coaxially to the optical axis of the objective lens.

At the connection ring a counter rotation stop is present that is configured to get into abutment with the rotation stop of the objective lens mount. In doing so, the relative rotation position of the connection device relative to the objective lens mount in a circumferential direction about the optical axis or the longitudinal axis can be defined.

The connection device also comprises two counter locking parts that are arranged with distance to each other in circumferential direction and with distance to the optical axis. The counter locking parts extend particularly radial to the optical axis and can be configured as radial projections that project from the connection ring. Each counter locking part has a counter locking surface. The counter locking surface is configured to get into abutment with the locking surface of the objective lens mount.

The counter rotation stop can project radially outward from the connection ring.

BRIEF DESCRIPTION OF THE DRAWINGS

Preferred embodiment of the invention can be derived from the dependent claims, the specification and the drawings. In the following preferred embodiments of the invention are discussed in detail with reference to the attached drawings. The drawings show:

DETAILED DESCRIPTION

Figure 1:
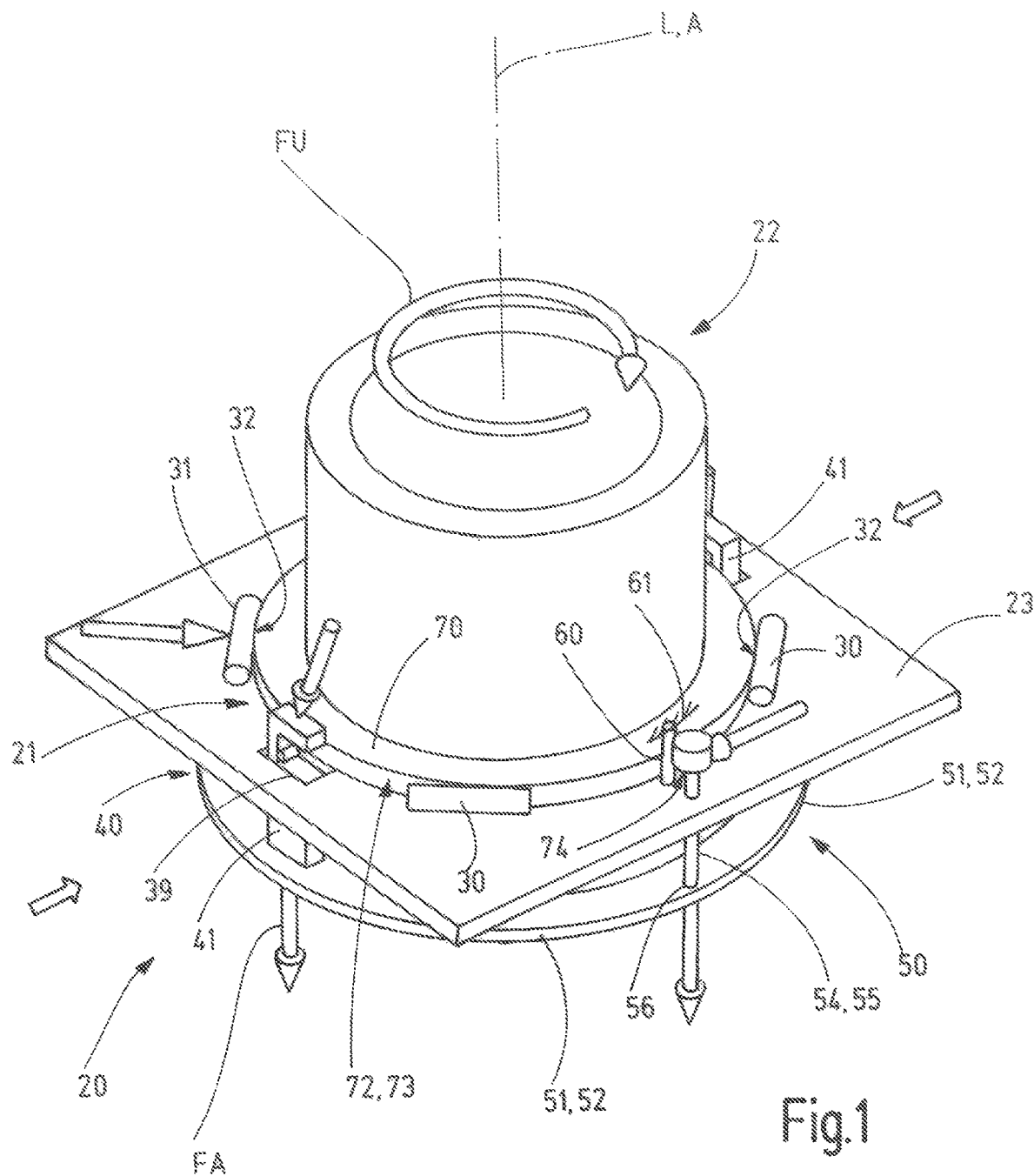
FIG. 1—schematic principle illustration of an embodiment of an objective lens mount with an objective lens comprising a connection device, wherein a connection is established between the objective lens mount and the connection device, FIG. 2—a principle illustration of the objective lens mount of FIG. 1 in a top view, FIG. 3—a principle illustration of the objective lens of FIG. 1 in a view along the optical axis of the objective lens, FIG. 4—a principle illustration of the objective lens and the objective lens mount of FIG. 1 in a top view, FIG. 5—a sectional view through the arrangement of FIG. 4 according to the line V-V, FIG. 6—a sectional view through the arrangement of FIG. 4 according to line VI-VI, FIG. 7—a principle illustration of a locking part of the objective lens mount, FIG. 8—principle illustration of a locking device of the objective lens mount in a release condition, FIGS. 9 and 10—the locking device of FIG. 8 in a locking condition in different side views, FIG. 11—a perspective view of an embodiment of an objective lens mount, FIG. 12—the objective lens mount of FIG. 11 without a ring partially covering the positioning bodies, FIG. 13—an embodiment of a locking device of the objective lens mount according to FIGS. 11 and 12, FIG. 14—schematic side view of an objective lens with a connection device, FIG. 15—a perspective illustration of the objective lens of FIG. 14, FIG. 16—a perspective illustration of an embodiment of a connection device that is configured as adapter between an objective lens and the objective lens mount and FIG. 17—a schematic principle illustration for establishing an electrical connection between a data carrier at the objective lens or at the connection device and a control device of a camera or measuring device.
Figure 2:
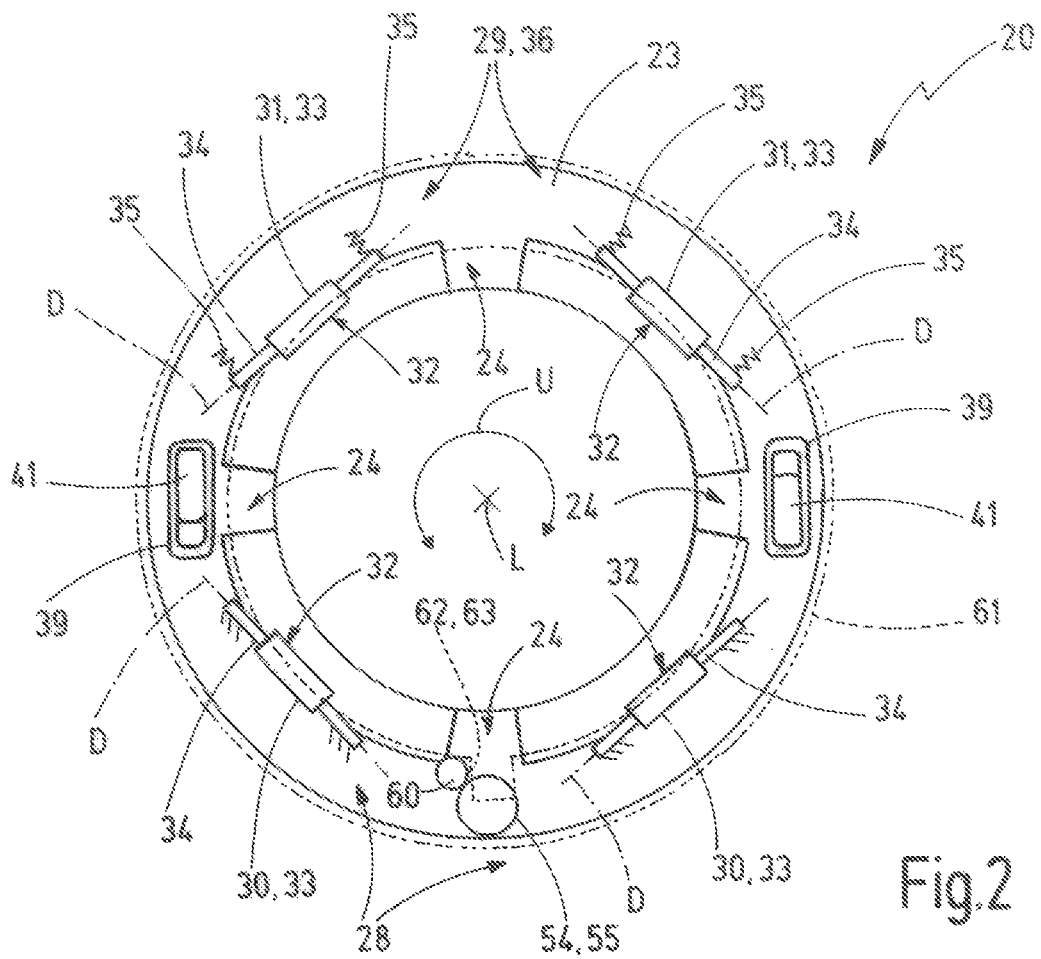
Figure 3:
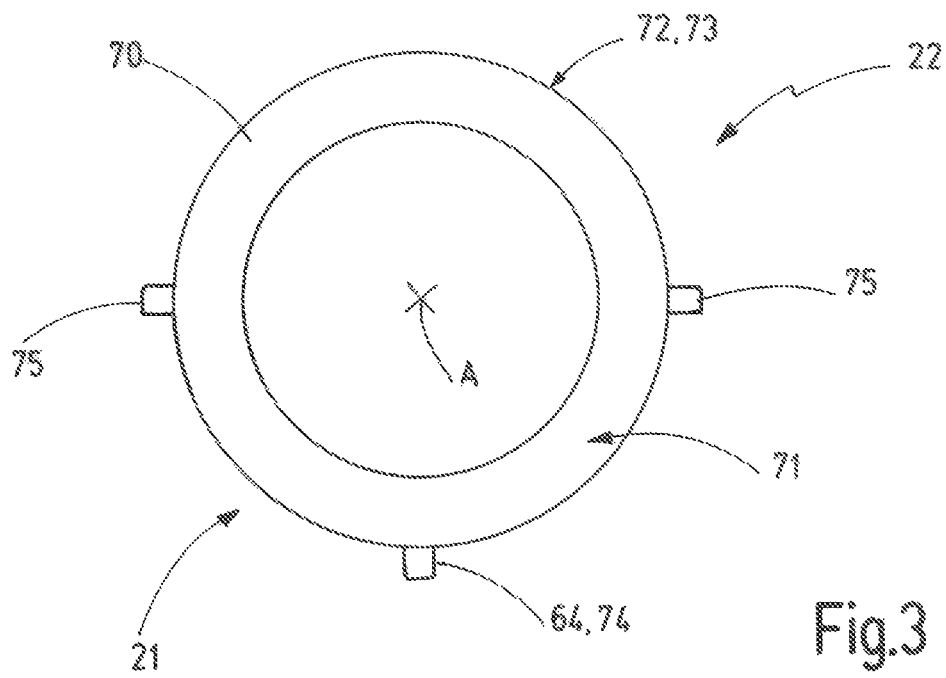
Figure 4:
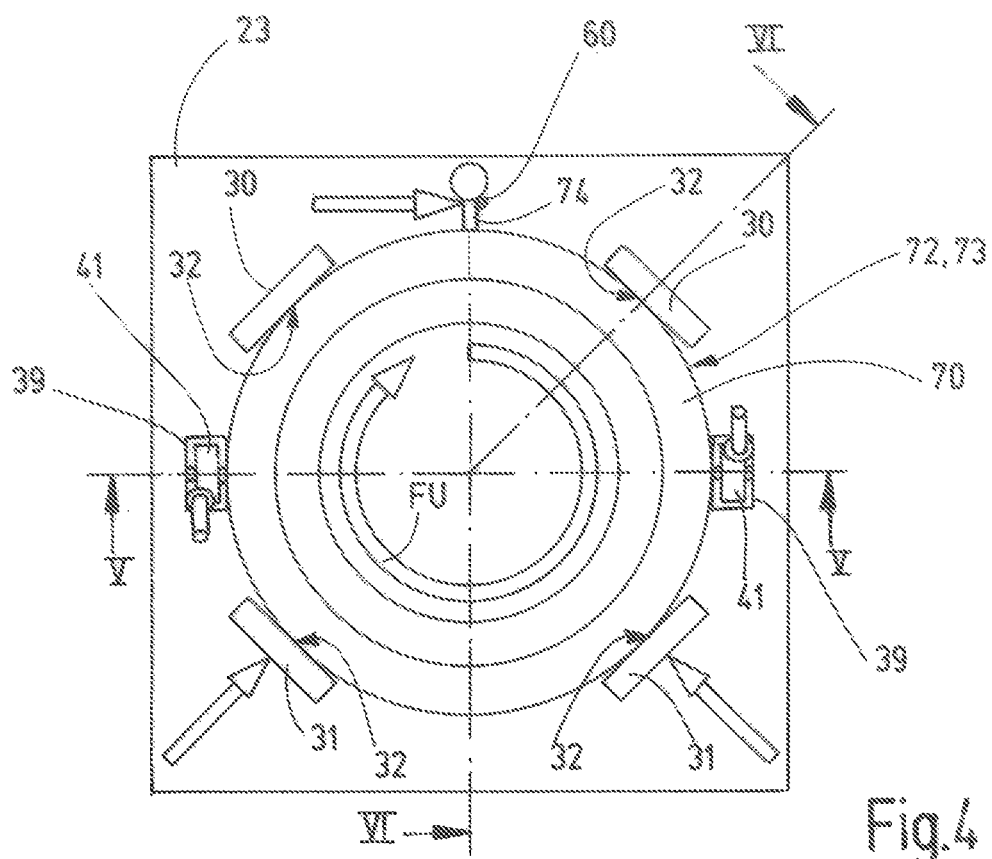
Figure 5:
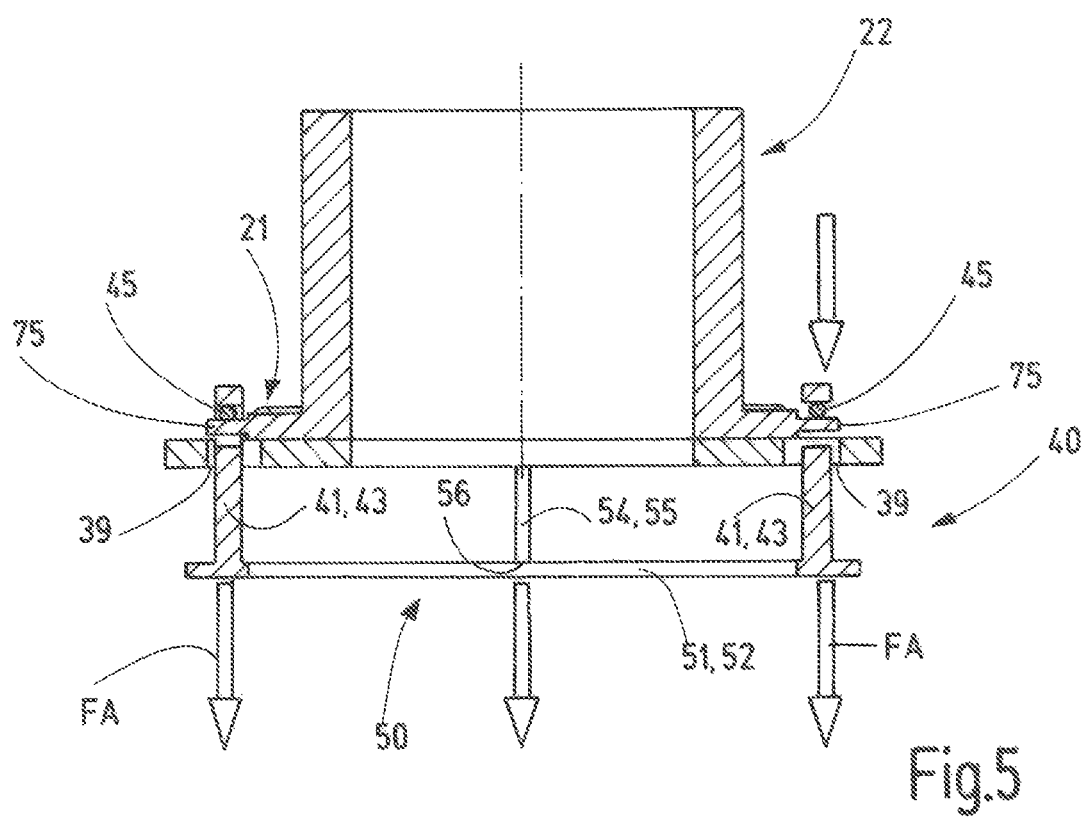
Figure 6:
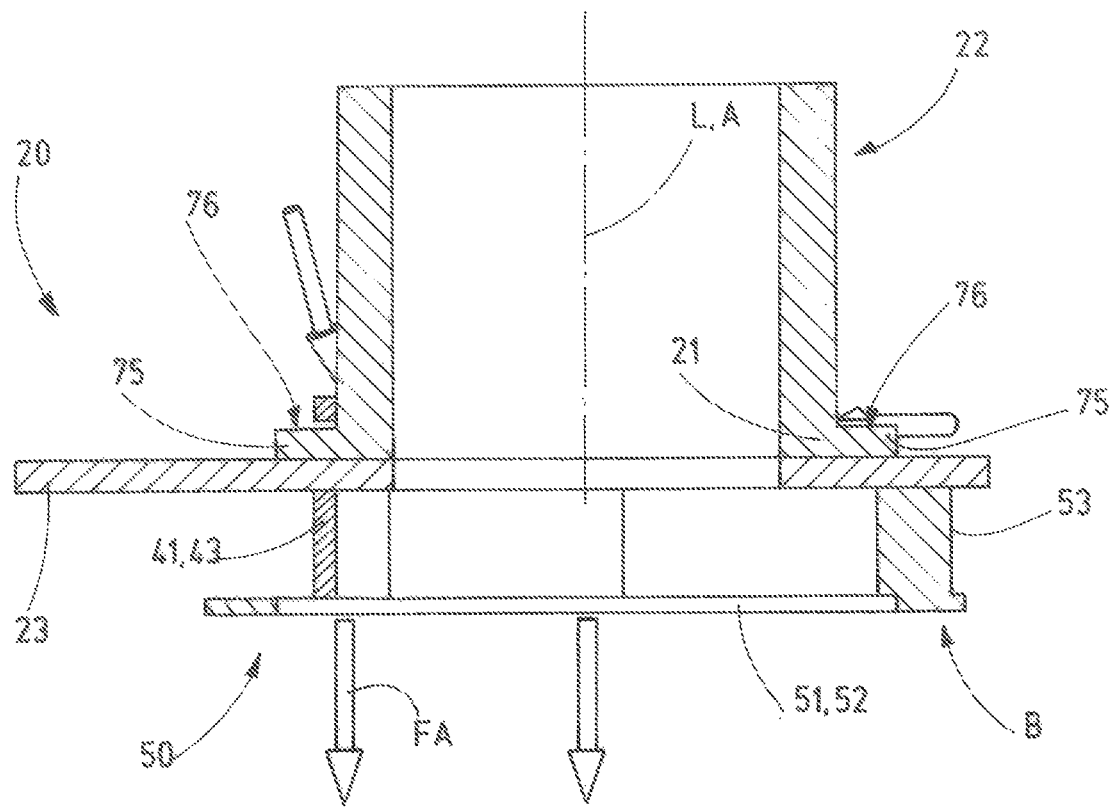

In FIG. 1 an arrangement of an objective lens mount 20 with a connection device 21 of an objective lens 22 attached to the objective lens mount 20 is illustrated in form of a perspective principle sketch. An embodiment of the objective lens mount 20 is shown in the perspective illustrations according to FIGS. 11 and 12. FIG. 2 shows a top view of the objective lens mount 20 along a longitudinal axis L in a schematic principle illustration.

The objective lens mount 20 has an abutment part 23 that is ring-shaped according to the example and can extend coaxially and non-coaxially in a circumferential direction U about the longitudinal axis L. The ring-shaped abutment part 23 is completely closed in circumferential direction U about the longitudinal axis L in the embodiment. According to the example, the abutment part 23 is integrally formed by one single body and can have multiple parts in a modified embodiment.

At the abutment part 23 at least one abutment surface 24 is present that extends in a plane that is orientated orthogonal to the longitudinal axis L. In the embodiment a plurality of abutment surfaces 24 are present that extend in the same plane orthogonal to the longitudinal axis L. The abutment surfaces 24 are equally distributed in circumferential direction U and arranged distant to each other. In the embodiment four abutment surfaces 24 are present.

The objective lens mount 20 has additionally at least one positioning body pair 28, 29. In the illustrated embodiment a first positioning body pair 28 and a second positioning body pair 29 are present. The first positioning body pair 28 has two first positioning bodies 30 and the second positioning body pair 29 has two second positioning bodies 31. The positioning bodies 30, 31 are arranged with distance to the longitudinal axis L and with distance in circumferential direction U to each other. The positioning bodies 30, 31 are arranged at a base part 61 according to the example. The base part 61 is schematically shown in dashed lines in FIG. 2 and in the perspective illustration in FIG. 11. It is arranged adjacent to the abutment part 23 in axial direction to the longitudinal axis L and preferably has a circular opening for the objective lens or for the connection device 21. The base part 61 can be ring-shaped or circular ring-shaped.

Each positioning body 30, 31 has a positioning surface 32 that faces the longitudinal axis L. The positioning surfaces 32 of the two first positioning bodies 30 extend obliquely to each other within a radial plane to the longitudinal axis L and include an angle that is larger than 0° and smaller than 180°, particularly an angle of 90°. Analog to this, also the positioning surfaces 32 of the second positioning bodies 31 are arranged obliquely to each other in a radial plane to the longitudinal axis L and include an angle larger than 0° and smaller than 180°, particularly an angle of 90°. In an embodiment a respective positioning surface 32 of a first positioning body 30 is arranged parallel to a positioning surface 32 of a second positioning body 31 that are arranged opposite to each other with regard to the longitudinal axis L (FIG. 2). As it can also be seen in FIG. 2 for example, the positioning surfaces 32 of the positioning bodies 30, 31 are orientated tangentially to the circumferential direction U.

In the embodiment each positioning surface 32 is formed by a section of a respective cylinder skin surface. According to the example, each positioning body 30, 31 is formed by a positioning sleeve 33, wherein each positioning sleeve 33 is rotatably supported about a respective rotation axis D. Each rotation axis D extends tangentially relative to the circumferential direction U and preferably in a radial plane to the longitudinal axis L. Particularly all of the rotation axes D are arranged in one common radial plane. The rotation axes D extend orthogonal to the longitudinal axis L. For the rotational support a respective positioning sleeve 33 is rotatably supported on a respective axis pin 34, preferably via roller bearings. The center axes of the axis pins 34 form the rotation axes D.

The first positioning bodies 30 can be positioned orthogonal or radial to the longitudinal axis L, wherein this position is maintained when the connection device 21 or the objective lens 22 is mounted or removed. The position relative or the distance to the longitudinal axis L can be adjusted and fixed for calibrating, e.g. by adjusting means, like adjusting screws or the like. The adjusting means can effect a position change and fixation in the adjusted position between the base part 61 and the respective axis pin 34.

Different thereto the second positioning bodies 31 are moveably supported orthogonal or radial to the longitudinal axis L and are urged in direction toward the longitudinal axis L by a biasing force. The biasing force can be created by one or more springs, particularly helical springs 35. The helical springs 35 can, for example, urge the axis pins 34 in direction toward the longitudinal axis L, as it is schematically illustrated in FIG. 2. In the embodiment the second positioning body pair 29 forms a biasing device 36 of the objective lens mount 20.

In the embodiment the base part 61 covers the axis pins 34, the helical springs 35 and the positioning sleeves 33 at least partly, wherein the positioning surfaces 32 remain uncovered.

Figure 8:
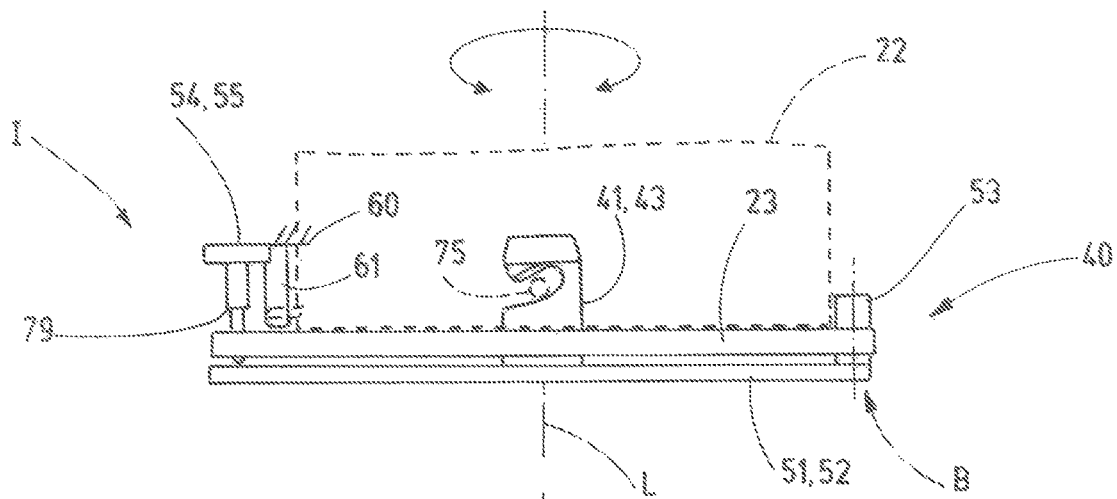
Figure 9:
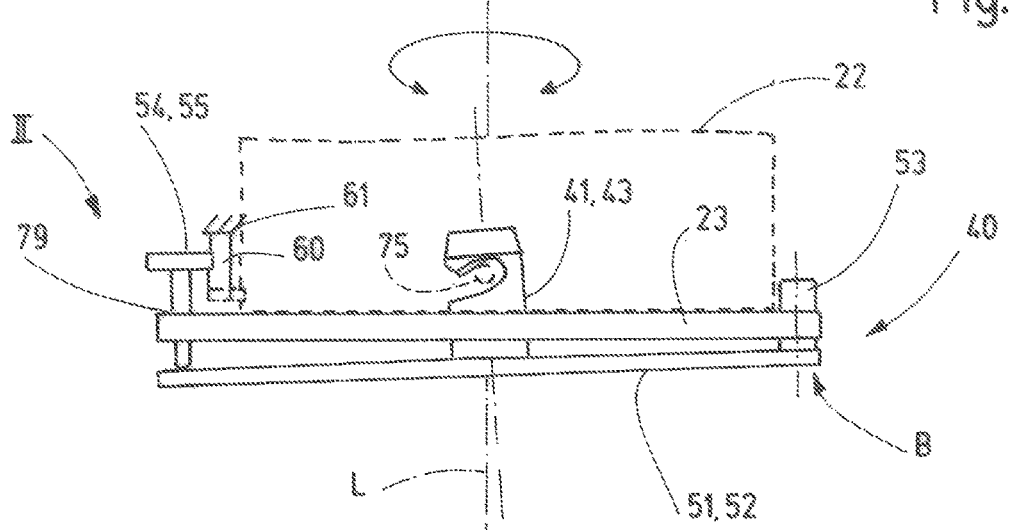
Figure 10:
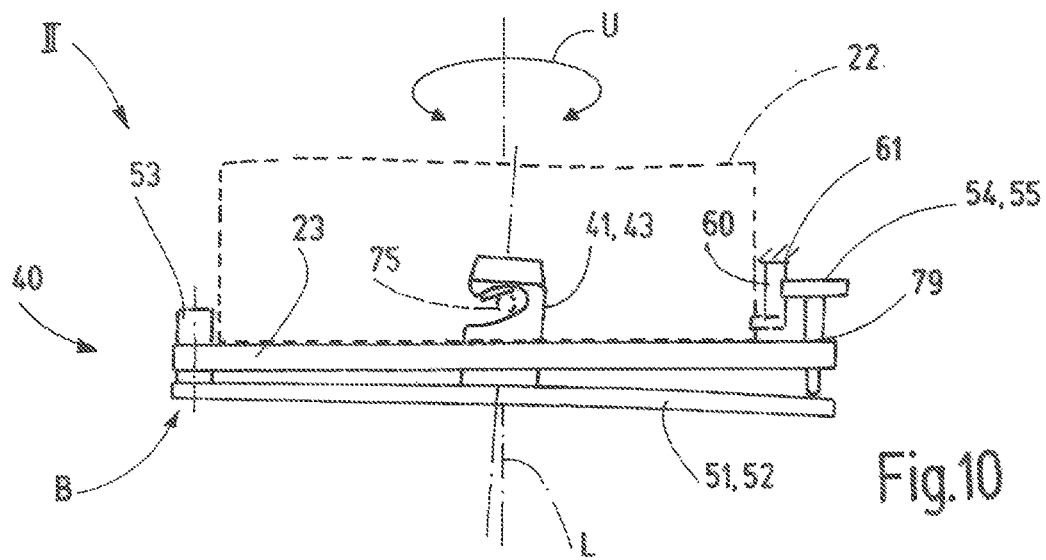

The objective lens mount 20 additionally has a locking device 40. The locking device 40 is particularly shown in FIGS. 8-10 and FIG. 13. The locking device 40 can be switched between a release condition I (FIG. 8) and a locking condition II (FIGS. 9 and 10). In the release condition I the mounting of a connection device 21 or an objective lens 22 at the objective lens mount 20 as well as the removing of a connection device 21 or an objective lens 22 from the objective lens mount 20 is possible. In the locking condition II a connection device 21 or an objective lens 22 is attached to the objective lens mount 20 and is retained by the locking device 40. Removing of the connection device 21 or the objective lens 22 from the objective lens mount 20 is blocked in the locking condition II.

The locking device 40 comprises two locking parts 41 arranged with distance to the longitudinal axis L and arranged with distance to each other in circumferential direction U. Preferably the locking parts 41 are arranged diametrically opposite each other respective to the longitudinal axis L and have both the same distance to the longitudinal axis L. The locking parts 41 are identically configured according to the example and each locking part 41 comprises a locking surface 42. The locking surfaces 42 extend at least in a section obliquely in circumferential direction U and thus have an inclination in circumferential direction U. In the described embodiment the inclination of each locking surface 42 is linear. The locking surfaces 42 can alternatively to the preferred embodiment also extend parallel to a plane that is orientated rectangular to the longitudinal axis L. Additionally or alternatively, a counter locking surface configured for abutment at a respective locking surface 42 can also have a respective inclination in circumferential direction U.

The locking parts 41 are moveably and for example pivotably supported relative to the base part 61 and the abutment part 23, such that they can execute a relative movement relative to the base part 61 and the abutment part 23 in direction of the longitudinal axis L. For this the locking parts 41 can extend through openings 39 in the abutment part 23.

Figure 7:
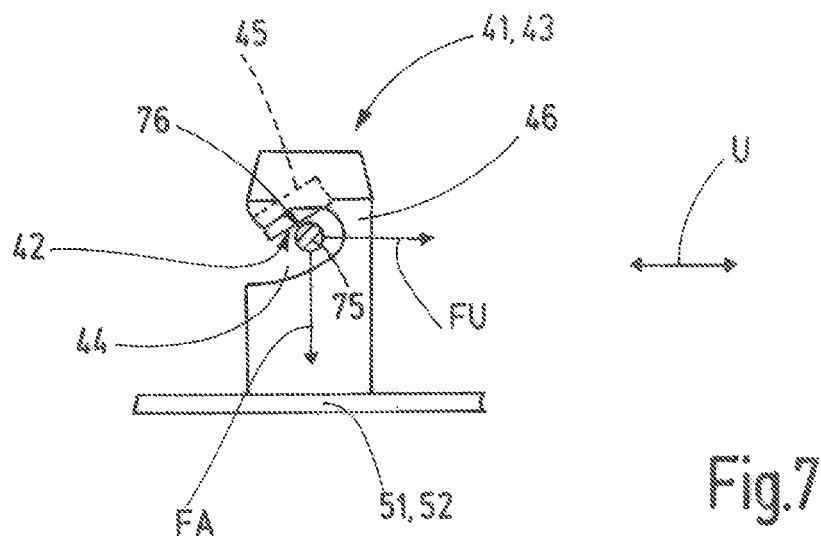

FIG. 7 shows an embodiment of a locking part 41 in the form of a locking hook 43. The locking hook 43 has at one side a hook cavity 44 that is open in circumferential direction U. Inside the hook cavity 44 the locking surface 42 is arranged inclined to the circumferential direction U. According to the example, the locking surface 42 is formed by a section of a cylinder skin surface. For this the locking hook 43 can comprise a locking pin 45 that is arranged in a support part 46 of the locking hook 43. The cylindrical skin surface of the locking pin 45 is partly accessible inside the hook cavity 44. This accessible section of the cylinder skin surface of the locking pin 45 or a portion thereof forms the locking surface 42. In this embodiment the support part 46 and the locking pin 45 can be made from different materials.

According to the example, the locking pin 45 is cylindrical and its cylinder longitudinal axis extends inclined in circumferential direction U and with distance to the longitudinal axis L. The cylinder longitudinal axis of the locking pin 45 is preferably tangentially arranged relative to a cylinder skin surface that extends coaxially to the longitudinal axis L.

The locking device 40 further comprises a force generating unit 50. The force generating unit 50 has at least one spring in order to create a force with a force component parallel to the longitudinal axis L between the abutment part 23 and the locking parts 41. In doing so, a connection device 21 can be retained at the objective lens mount 20. As already explained above, according to the embodiment the locking parts 41 or locking hooks 43 are moveably supported relative to the abutment part 23 in direction of the longitudinal axis L. As best shown in FIGS. 5, 8-10 and 13, the locking parts 41 or locking hooks 43 are supported at a common part of the force generating unit 50 and according to the example at a ring part 51. The locking parts 41 are particularly fixedly connected with the ring part 51. The ring part 51 can be moved and/or deformed relative to the abutment part 23. A force with the force component parallel to the longitudinal axis L can be applied onto the locking parts 41 via the ring part 51.

The abutment part 23 is arranged between the ring part 51 and the base part 61 in direction of the longitudinal axis L.

Figure 13:
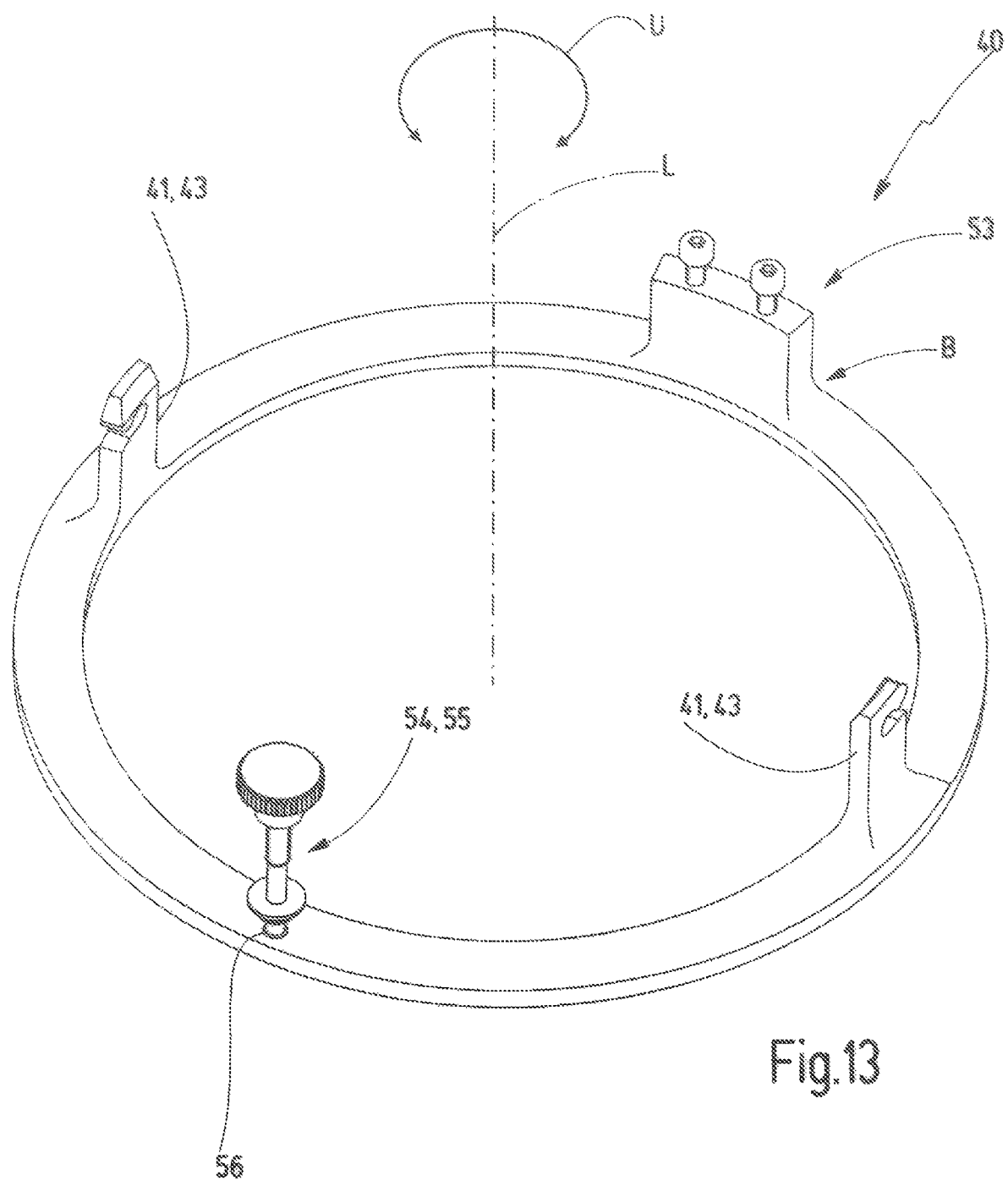

In the embodiment the ring part 51 is formed by a bending flexible spring 52. The bending flexible spring 52 is fixed to the base part 61 at a fixing location B by a fixing device 53. At a location that is diametrically opposed to the fixing location B with regard to the longitudinal axis L an operating element 54 is arranged at the base part 61 in the embodiment that can act on the bending flexible spring 52. For example, the operating element 54 can be formed by an operating screw 55. The operating element 54 has a free end 56 that faces the bending flexible spring 52. By displacing the operating element 54 or the free end 56 in direction of the longitudinal axis L, the bending flexible spring 52 can be elastically deformed (FIGS. 9 and 10) starting from an initial position (FIGS. 8 and 13). Because the bending flexible spring 52 is fixedly connected with the locking parts 41, they can execute a pivot movement with a movement component in direction of the longitudinal axis L. In doing so, the locking surfaces 42 can be urged and according to the example, pulled in direction toward the abutment surface 24 or in direction toward the abutment part 23 by the spring force of the bending flexible spring 52.

Different to the illustrated embodiment a spring force can also be created by other springs that are supported at one side at the ring part 51 and at the other side at the base part 61 and/or at the abutment part 23, wherein the distance and thus the spring force between the ring part 51 and the base part 61 or abutment part 23 can be adjusted by the operating element 54 or alternatively a plurality of operating elements.

If the at least one spring and, for example, the bending flexible spring 52 of the force generating unit 50 is in a knot or a negligible charged initial position by the operating element 54, the locking device 40 adopts the release position I (FIG. 8). On the contrary, if a predefined force is created via the at least one spring and according to the example via the bending flexible spring 52, if the connection device 21 or the objective lens 22 is arranged at the objective lens mount 20 and if the force is transferred via the locking parts 41 or the locking surfaces 42 onto the connection device 21 or the objective lens 22, the locking device 40 adopts the locking condition II (FIGS. 9 and 10).

The objective lens mount 20 comprises a rotation stop 60 that has a distance to the longitudinal axis L and is arranged at the base part 61 according to the example. The fixing of the rotation stop 60 at the base part 61 is shown highly schematic in FIGS. 1, 8, 9 and 10, wherein the base part 61 is symbolized only by a line for sake of clarity. The base part 61 can be ring-shaped. It is opposed to the abutment part 23 at the side, at which the at least one abutment surface 24 is arranged. The rotation stop 60 extends away from the base part 61 toward the abutment part 23 in direction of the longitudinal axis L. In the embodiment the rotation stop 60 has a cylindrical shape.

At a circumferential location and according to the example adjacent to the operating element 54 and/or substantially diametrically opposed to the fixing location B, a mechanical coding device 62 in form of a coding cavity 63 is provided in or at the base part 61. The mechanical coding device 62 is configured to define the rotation position of the connection device 21 relative to the objective lens mount 20 in circumferential direction U about the longitudinal axis L when the connection is established. In doing so, it can be avoided that the connection device 21 with the objective lens 22 can be arranged in different rotational positions about the longitudinal axis L at the objective lens mount 20. In the embodiment the coding cavity 63 cooperates with a coding projection 64 at the connection device 21 or the objective lens 22. The connection device 21 can only be placed onto the abutment surfaces 24 in a rotational position or in a certain rotational position range about the longitudinal axis L, in which the coding cavity 63 allows the insertion of the respective coding projection 64.

Figure 11:
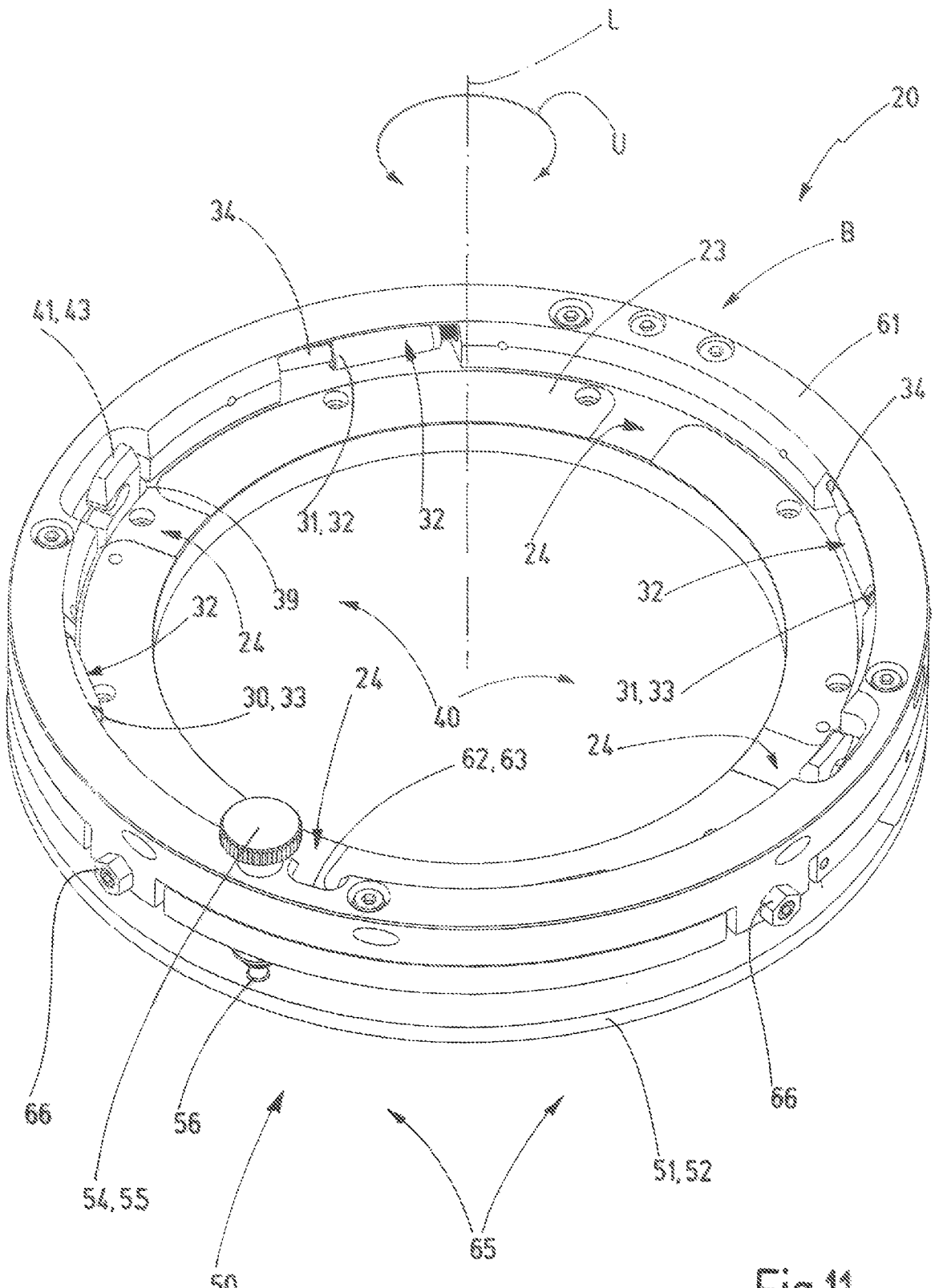
Figure 12:
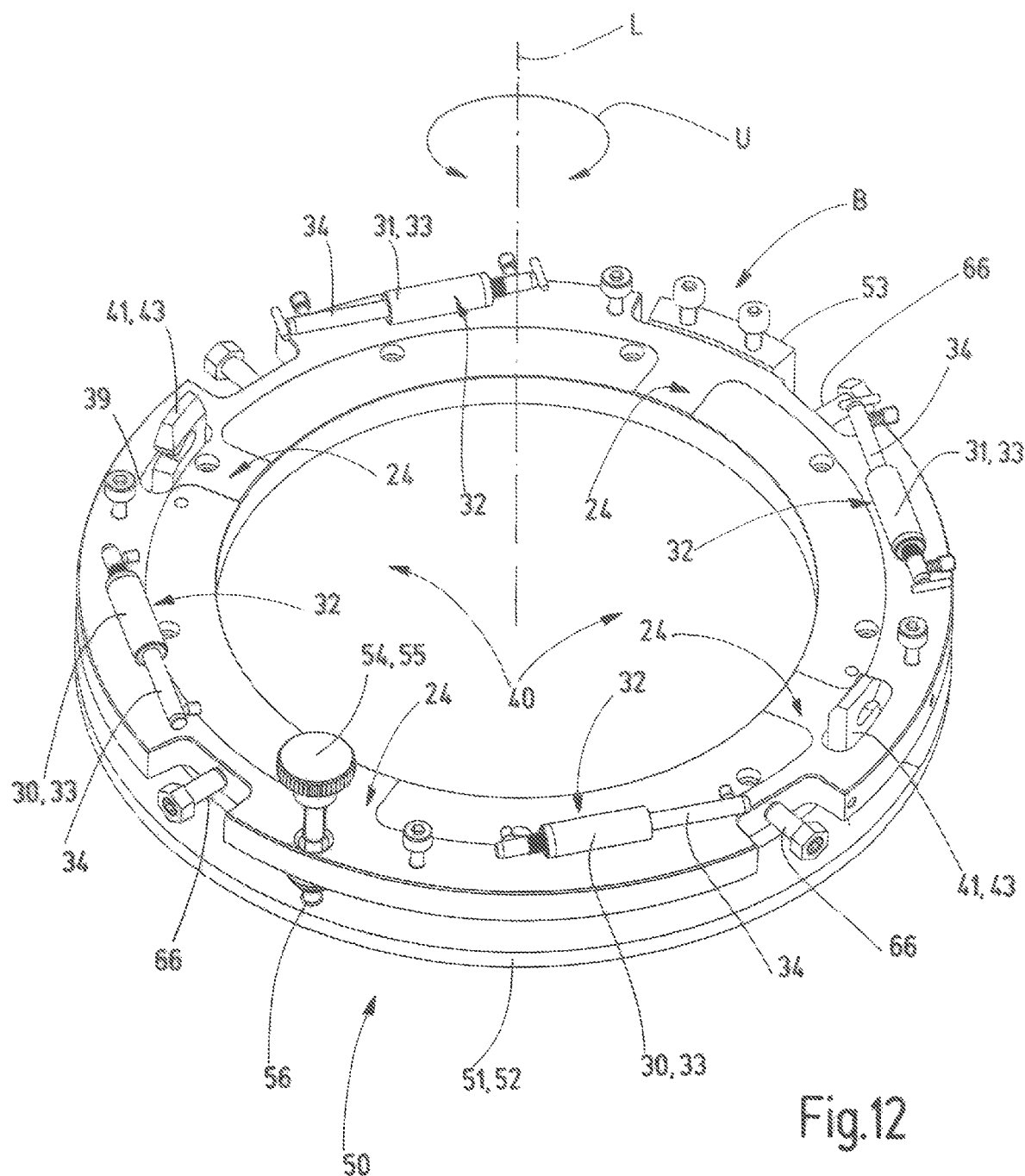

FIG. 11 shows a further embodiment of the objective lens mount 20. By means of an adjustment device 65, the position of the objective lens mount 20 can be adjusted in a plane radial to the longitudinal axis L relative to the abutment part 23. For adjustment one or more adjustment screws 66 can be present in order to position at least parts of the objective lens mount 20 and according to the example, the base part 61 together with the components of the objective lens connected therewith relative to the abutment part 23 and to fix it in the desired position. The abutment part 23 can be non-moveably arranged relative to a camera or an interferometer or an optic or a housing of a measuring device.

In the embodiment the adjustment device 65 is configured to shift the ring-shaped base part 61 at least orthogonal to the longitudinal axis L and relative to the abutment part 23 in at least one or two space directions. Alternatively or additionally the adjustment device 65 is configured to shift the base part 61 relative to the abutment part 23 parallel to the longitudinal axis L of the objective lens mount 20.

The connection device 21 at the objective lens 22 serves as counter part for the objective lens mount 20. In the embodiment the connection device 21 comprises a connection ring 70 with at least one counter abutment surface 71. Either separate counter abutment surfaces 71 are present at the connection ring 70 for each abutment surface 24 or, as in the present embodiment, one single continuous counter abutment surface 71 is configured for abutment with all of the present abutment surfaces 24 of the objective lens mount 20. In the embodiment the counter abutment surface 71 is ring-shaped. The at least one or exactly one counter abutment surface 71 extends in a plane radial to an optical axis A of the objective lens 22. A plane-plane-mating is formed between an abutment surface 24 and the respective assigned counter abutment surface 71 according to the example.

At the connection ring 70 a ring outer surface 72 that faces away from the optical axis A of the objective lens 22 is present that extends coaxially to the optical axis A. The ring outer surface 72 forms at least one counter positioning surface 73 that is configured for abutment at the positioning surfaces 32 of the objective lens mount 20. Different to the illustrated embodiment, a separate counter positioning surface 73 could be assigned to each positioning surface 32.

Radial to the optical axis A of the objective lens a counter rotation stop 74 extends away from the connection ring 70. In the embodiment the counter rotation stop 74 is configured cylindrically. Preferably the counter rotation stop 74 can concurrently form the coding projection 64. The counter rotation stop 74 abuts against the rotation stop 60, if the connection between a connection device 21 and the objective lens mount 20 is completely established. Because the rotation stop 60 as well as the counter rotation stop 74 are configured cylindrically in the embodiment, a cylindercylinder-mating is created with a substantially point-like abutment, because the cylinder axes extend substantially orthogonal to each other.

At the connection ring 70 additionally two counter locking parts 75 are arranged that are arranged with distance to each other in a circumferential direction C about the optical axis A. In the embodiment the counter locking parts 75 are diametrically opposed with regard to the optical axis A of the objective lens 22. In the embodiment the counter locking parts 75 are cylindrical, wherein the cylinder axes are preferably orthogonal relative to the optical axis A of the objective lens 22.

At each counter locking part 75 a counter locking surface 76 is present. The counter locking surface 76 is formed by a section of the cylinder skin surface of each counter locking part 75 in the embodiment. The counter locking surface 76 is configured for abutment with one respective assigned locking surface 32, if the connection between the connection device 21 and the objective lens mount 20 is established. According to the embodiment, in doing so, a cylinder-cylinder-mating is created. Because the cylinder axes of the locking pins 55 and the cylinder axes of the respective associated counter locking part 75 are substantially orientated orthogonal to each other, a point-shaped abutment is created.

Figure 14:
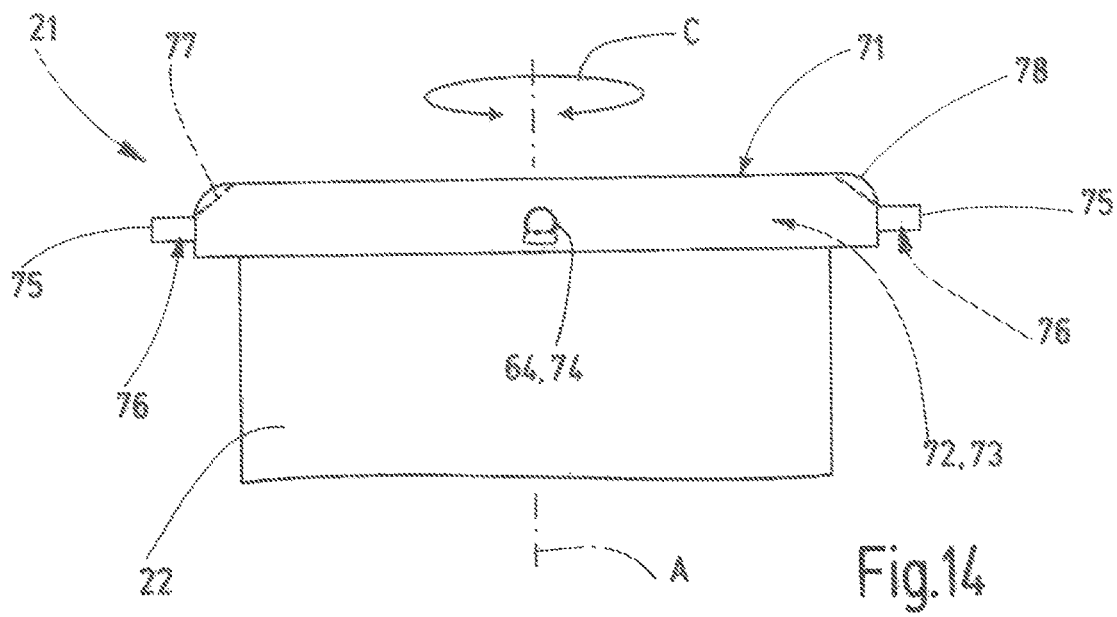
Figure 15:
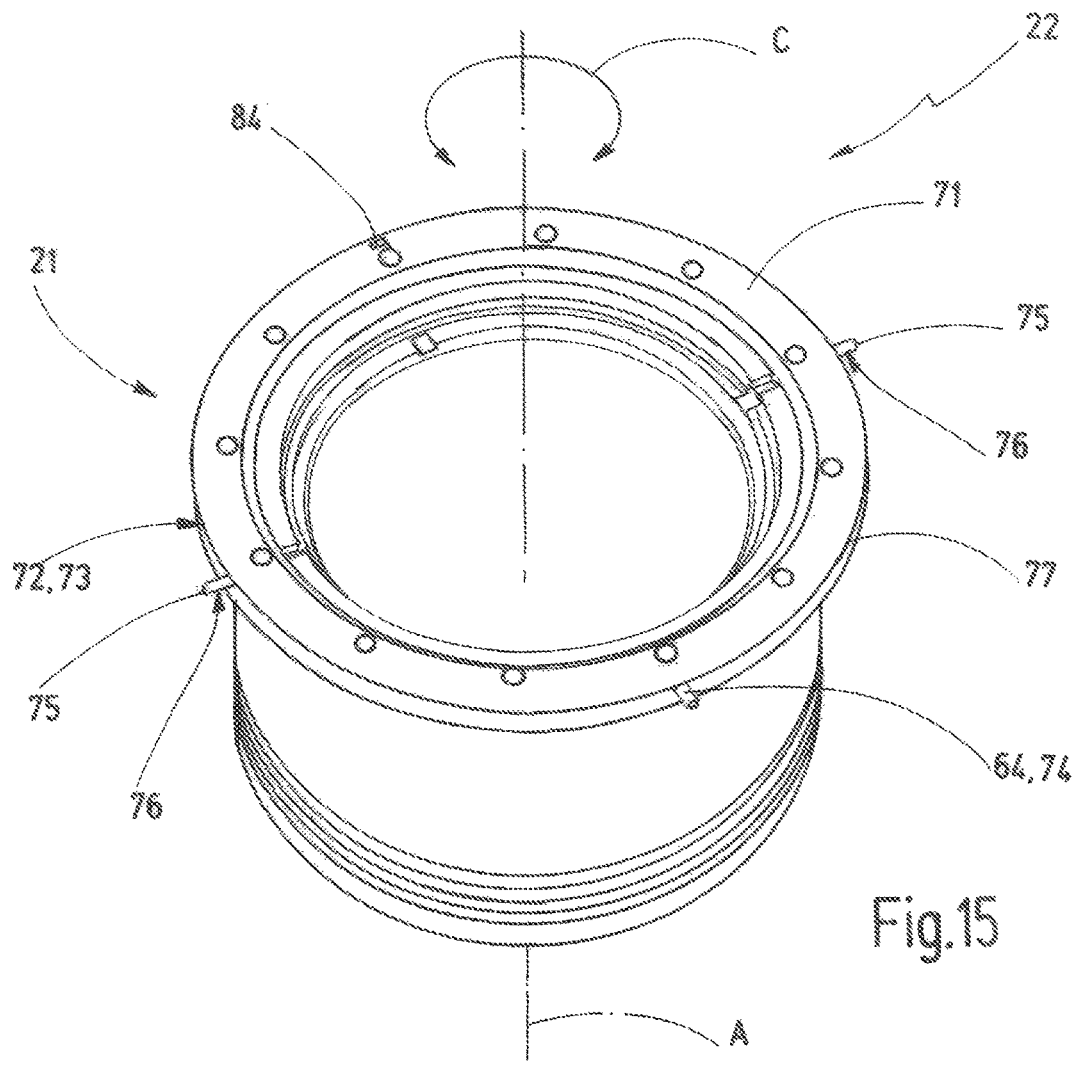

As it is shown in FIG. 14 and in FIG. 15, transition with a chamfer 77 (FIG. 15, dashed in FIG. 14) or a radius 78 (solid line in FIG. 14) is formed between the counter abutment surface 71 and the ring outer surface 72 or the counter positioning surface 73. In doing so, the mount of the connection device 21 along the longitudinal axis L of the objective lens mount 20 is simplified.

The creation of the connection between the objective lens 22 and the objective lens mount 20 is carried out as follows:

The objective lens 22 is substantially arranged along the longitudinal axis L of the objective lens mount 20, such that the at least one abutment surface 24 and the at least one counter abutment surface 71 are opposed to each other. The coding projection 64, that also forms the counter rotation stop 74 in this case, is placed in a rotation position about the longitudinal axis L, such that it is aligned in axial direction parallel to the longitudinal axis L with the coding cavity 63. Subsequently, a relative movement along the longitudinal axis L is carried out, such that the coding projection 64 is inserted in the coding cavity 63 and the connection ring 70 gets first into contact with the positioning bodies 30, 31 and according to the example, the rotatably supported positioning sleeves 33. The chamfer 77 or the radius 78 support the insertion of the connection ring 70 between the positioning bodies 30, 31. During this insertion the second positioning bodies 31 evade by movement radial away from the longitudinal axis L. The objective lens 22 and the objective lens mount 20 are moved toward each other until the at least one abutment surface 24 abuts at the at least one counter abutment surface 71. The second positioning bodies 31 press radially on the ring outer surface 72 or the counter positioning surface 73, such that the counter positioning surface 73 abuts tightly at the respective positioning surface 32 of the first positioning bodies 30 that are unmoveably positioned orthogonal or radial to the longitudinal axis L.

Because the positioning bodies 30, 31 are formed by rotatably supported positioning sleeves 33 in the present embodiment, the mount of the connection ring 70 between the positioning sleeves 33 can be carried out with low wear, such that also with repeated exchange of the objective lens 22 no wear occurs that affects the positioning accuracy.

The relative rotating position between the objective lens 22 and the objective lens mount 20 in this situation leaves a distance between the rotation stop 60 and the counter rotation stop 74 in circumferential direction U about the longitudinal axis L. The counter locking parts 75 are placed outside of the respective assigned hook cavity 44. In this position a relative rotation of the objective lens 22 with the connection device 21 is carried out relative to the objective lens mount 20, e.g. clockwise, until the counter rotation stop 74 abuts at the rotation stop 60.

In this position the counter locking parts 75 are placed inside a respective assigned hook cavity 44. Between the locking surface 42 and the counter locking surface 76 a distance exists first, as it is schematically shown in FIG. 8. The locking device 40 adopts the release condition I that allows the amount of the objective lens 22. By means of the operating element 54 and according to the example, the operating screw 55, the locking device 40 is transferred into the locking condition II. For this the operating screw 55 is moved by screwing in or screwing through the base part 61 and by guiding through the abutment part 23 with its free end 56 against the bending flexible spring 52 in direction of the longitudinal axis L until the locking condition II is reached. The reaching of the locking condition II can be defined by a mechanical stop 79 at the operating element 54 or the operating screw 55. If the mechanical stop 79 abuts against the base part 61 or at another appropriate counter stop of the objective lens mount 20, the locking condition II is reached (FIGS. 9 and 10). The stop 79 can be formed by a ring shoulder at the operating element 54 operating element 54 for example.

In the locking condition II the operating element 54 deflects the bending flexible spring 52 from its non-deflected initial position and deforms the bending flexible spring 52, as it is schematically illustrated in FIGS. 9 and 10. Due to this deformation, the locking hooks 43 execute a pivot movement with a movement component parallel to the longitudinal axis L until the locking surface 42 abuts against the assigned counter locking surface 76. Due to a further deformation of the bending flexible spring 52, a respective force F is created between the locking surface 42 and the counter locking surface 76 that has an axial force component FA and a force component in circumferential direction FU (FIG. 7). Via the axial force component FA the at least one counter abutment surface 71 is urged against the at least one abutment surface 24. Via the force component FU in the circumferential direction U a counter rotation stop 74 is urged against the rotation stop 60. Via the biasing device 36 and according to the example the second positioning body pair 29, the connecting ring 70 is urged radial to the longitudinal axis L against the positioning surface 32 of the first positioning bodies 30.

Via the first positioning body pair 28 or with aid of the biasing device 36 the radial position of the optical axis A relative to the longitudinal axis L is defined. In doing so, a cylinder-cylinder-mating is used, if a contact between a respective positioning surface 32 and the associated counter positioning surface 73 is established providing a substantially point-shaped abutment.

In the embodiment a plurality of abutment surfaces 24 are present at which a respective associated counter abutment surface 71 and, according to the embodiment, one single continuous counter abutment surface 71 abuts. Because the abutment surfaces 24 are distributed in circumferential direction U and are particularly regularly distributed, a plurality of degrees of freedom are eliminated for the relative positioning or relative alignment of the objective lens 22 relative to the objective lens mount 20: In axial direction parallel to the longitudinal axis L as well as tilting about two space axes that are orientated orthogonal to each other and orthogonal to the longitudinal axis L. In this cooperation a plane-plane-mating at several locations and preferably at least three locations is used, wherein these locations are not arranged along one single line and are, according to the example, regularly distributed in circumferential direction U about the longitudinal axis L.

The degree of freedom of rotation about the longitudinal axis L is eliminated according to the example by the cooperation of the rotation stop 60 with the counter rotation stop 74. In doing so, a cylinder-cylinder-mating with a point-shaped contact is used.

Via the locking device 40 an adjustable force between the connection device 21 and the objective lens mount 20 is applied that may be predefined or at least limited. In doing so, a repeatedly exact arrangement of the objective lens 22 or the connection device 21 with equal pressing forces FA, FU can be arranged at the objective lens mount 20.

Due to the inventive arrangement, it is achieved that regularly no calibration is required after an objective lens exchange. If objective lenses 22 are used that respectively contain a similar connection device 21, they can be arranged at the objective lens mount 20 without additional calibration. Particularly the separation of the force application via the locking device 40 from the bodies and surfaces that serve for the relative positioning, a very exact and repeatedly precise alignment is possible.

For separating or releasing the connection between the objective lens 22 and the objective lens mount 20 the sequence described above is carried out in reverse order. First, the locking device 40 is switched in the release condition I. Subsequently, the objective lens 22 can be rotated counter-clockwise relative to the objective lens mount 20 and finally removed parallel to the longitudinal axis L from the objective lens mount 20.

Because the locking parts 41 or locking hooks 43 do not execute a linear movement parallel to the longitudinal axis L, but a pivot movement instead, it is advantageous, if a first positioning body pair 28 with first positioning bodies 30 is arranged adjacent to the operating element 54 and is arranged relative to the longitudinal axis L substantially opposite to the fixing device 53 or the fixing location B. Due to the pivot movement of the locking parts 41 or the locking hooks 43, they carry out a movement in direction away from the fixing device 53 or the fixing location B. Because the non-moveable first positioning bodies 30 are arranged in this direction, the radial position of the objective lens 22 relative to the objective lens mount 20 can be defined more precisely. The second positioning bodies 31 that are spring-tensioned and moveably supported toward the longitudinal axis L are preferably arranged adjacent to the fixing location B or the fixing device 53 in circumferential direction U.

Figure 16:
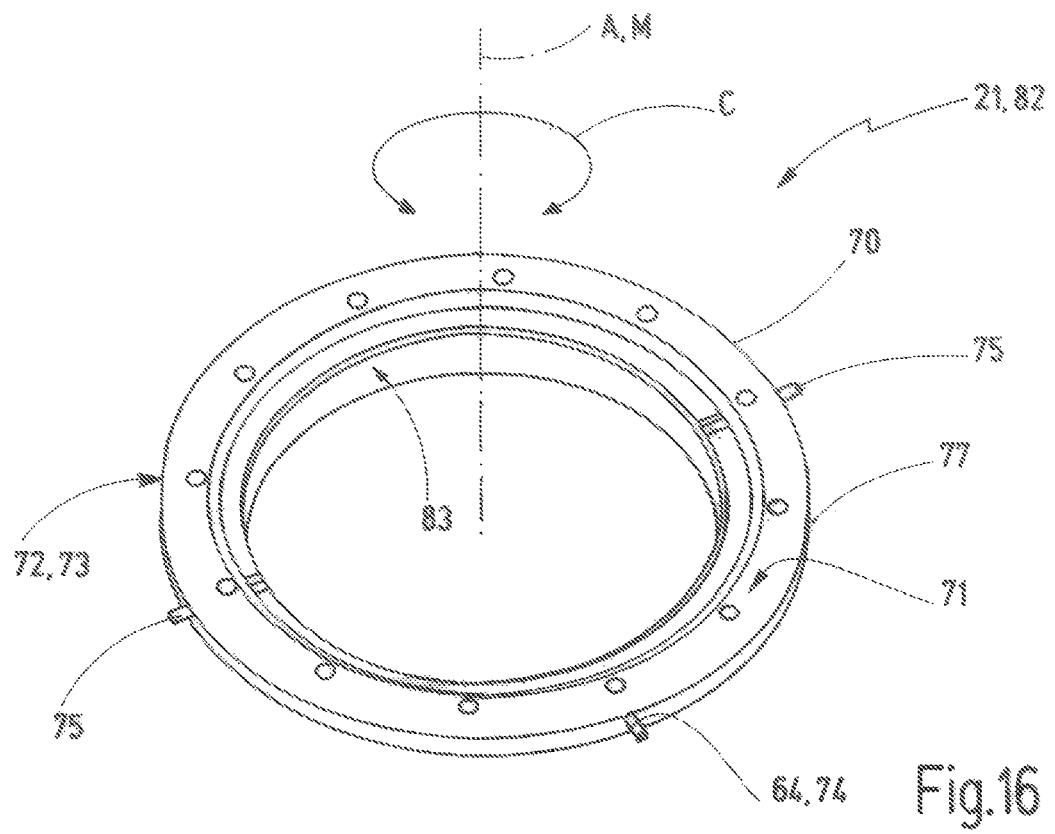

In FIG. 16 an embodiment of the connection device 21 is schematically illustrated that forms an adapter 82. The adapter 82 is further configured for connection with the objective lens 22 can comprise respective connection means for this purpose, e.g. an inner thread 83 or respective bayonet grooves, etc. Apart therefrom the connection device 21 of the adapter 82 corresponds to the connection device 21 of the objective lens 22, as it was explained above. A center axis M of the ring-shaped adapter 82 corresponds to the optical axis A of the objective lens or defines this optical axis A, when the objective lens 22 is arranged at the adapter 82.

Figure 17:
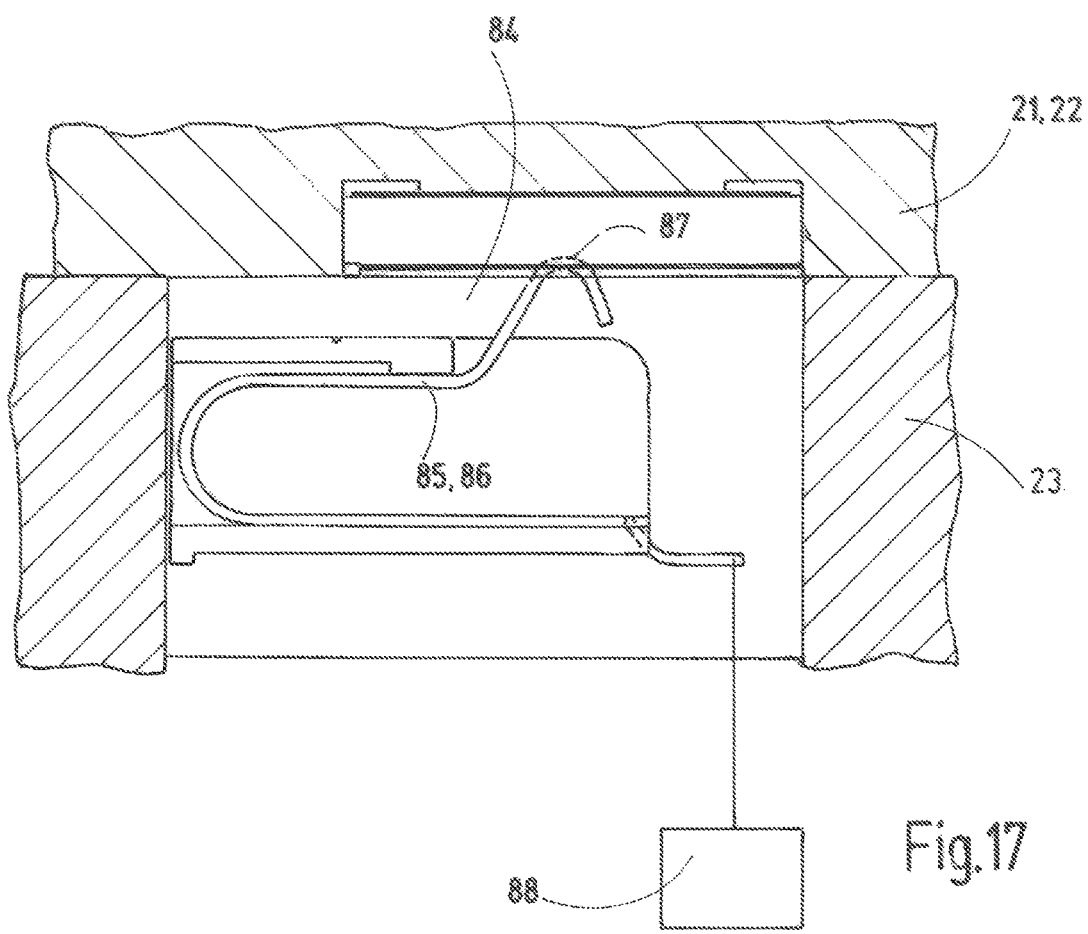

In FIGS. 15 and 17 is additionally schematically another optional embodiment is illustrated for creating an electric and/or electronic interface between the objective lens mount 20 and the objective lens 22 or the connection device 21. In a cavity or opening of the connection ring 70 that is open at the counter abutment surface 71 a data carrier 84 or another module with electric contact surfaces is arranged. The data carrier 84 is, for example, formed by a microchip. Its contact surfaces are accessible from outside.

At a respective location in circumferential direction about the longitudinal axis L at least one contact element 85 and for example a contact spring 86 made from an electric conducting material can be arranged inside the abutment part 23. The contact spring 86 has a contact section 87 that protrudes in its initial position from the abutment part 23 and is configured for abutment at the data carrier 84. The contact element 85 or the contact spring 86 can be electrically connected with a control device 88 of a camera or a measuring device—for example an interferometer or another optical measuring apparatus. For example, the control device 88 can be configured to retrieve information stored on the data carrier 84, such that the camera or measuring device can retrieve information about the type of the connected objective lens 22.

The number of contact elements 85 or contact springs 86 can vary dependent from the number of contact surfaces at the data carrier 84. Preferably two, three or more separate electric contact elements 85 are present that are electrically isolated from each other, wherein each of the contact elements 85 are associated to one contact surface at the data carrier 84.

The invention refers to an objective lens mount 20 as well as connection device 21 that can be releasably connected with each other. The connection device 21 is part of an objective lens 22 or of an adapter 82. The objective lens mount 20 has at least one abutment surface 24 extending orthogonal to a longitudinal axis L and that cooperates with at least one counter abutment surface 71 at the connection device 21. At least two V-shaped arranged first positioning bodies 30 with at least one positioning surface 32 are arranged with distance to the longitudinal axis L, such that the positioning surfaces 32 face the longitudinal axis L. At least one counter positioning surface 73 is present at the connection device 21 that can abut at the positioning surfaces 32 of the objective lens mount 20. The relative position in circumferential direction U about the longitudinal axis L can be defined via a rotation stop 60 of the objective lens mount 20 that cooperates with a counter rotation stop 74 of the connection device 21. A locking device 40 retains the connection device 21 at the objective lens mount 20, if the connection is established and effects for this purpose a force component FA in axial direction parallel to the longitudinal axis L and preferably additionally also a force component FU in circumferential direction U.

LIST OF REFERENCE SIGNS 20 objective lens mount
21 connection device
22 objective lens
23 abutment part
24 abutment surface
28 first positioning body pair
29 second positioning body pair
30 first positioning body
31 second positioning body
32 positioning surface
33 positioning sleeve
34 axis pin 35 helical spring
36 biasing device
39 opening
40 locking device
41 locking part
42 locking surface
43 locking hook
44 hook cavity
45 locking pin
46 support part
50 force generating unit
51 ring part
52 bending flexible spring
53 fixing device
54 operating element
55 operating screw
56 free end of the operating element
60 rotation stop
61 base part
62 mechanical coding device
63 coding cavity
64 coding projection
65 adjustment device
66 adjustment screw
70 connection ring
71 counter abutment surface
72 ring outer surface
73 counter positioning surface
74 counter rotation stop
75 counter locking part
76 counter locking surface
77 chamfer
78 radius
79 mechanical stop
82 adapter
83 inner thread
84 data carrier
85 contact element
86 contact spring
87 contact section
88 control device
I release condition
II locking condition
A optical axis of the objective lens
B fixing location
C circumferential direction about the optical axis
D rotation axis
FA axial force component
FU force component in circumferential direction
L longitudinal axis of the objective lens mount
M center axis
U circumferential direction about the longitudinal axis

The invention claimed is:

1. An objective lens mount of an optical measuring device that is configured for exchangeably mounting a connection device of an objective lens, the objective lens mount comprising:
at least one abutment surface that is provided at an abutment part and that is oriented orthogonally with respect to a longitudinal axis of the objective lens mount and that is configured for planar abutment with at least one counter abutment surface of the connection device, for defining an axial position of the connection device relative to the abutment part,
at least one positioning body pair that comprises two positioning bodies that are arranged with a distance with respect to the longitudinal axis respectively and that comprise positioning surfaces facing the longitudinal axis and oriented obliquely with regard to each other in a radial plane extending radially with respect to the longitudinal axis, wherein the positioning surface of individual ones of the positioning bodies is configured for one of a line-shaped abutment in a direction of the longitudinal axis or a point-shaped abutment with a counter positioning surface of the connection device, for defining a radial relative position of the connection device with respect to the objective lens mount,
a rotation stop that is configured for a line-shaped or point-shaped abutment with a counter rotation stop of the connection device for defining a relative position of the connection device relative to the objective lens mount in a circumferential direction about the longitudinal axis, and
a locking device comprising two locking parts arranged at a distance with respect to each other in a circumferential direction and at a distance with respect to the longitudinal axis and individual ones of the locking parts having a locking surface, wherein the locking surface is configured for abutment with a counter locking surface of the connection device,
wherein the locking device is configured to create a force between the abutment part and individual ones of the locking parts in a direction of the longitudinal axis in a locking condition in order to create a pressure force between the at least one abutment surface and the respective counter abutment surface,
wherein a pressing force in the circumferential direction between the rotation stop and the counter rotation stop is created when a connection between the objective lens mount and the connection device is established,
wherein individual ones of the locking surfaces comprise an inclination in the circumferential direction for creating the pressing force.

2. The objective lens mount according to claim 1, wherein the locking device is configured to adjust and/or limit the force applied on the locking surfaces parallel to the longitudinal axis in the locking condition of the locking device.

3. The objective lens mount according to claim 1, wherein the locking device comprises a force generating unit with at least one spring that is configured to exert a force on the locking surfaces parallel to the longitudinal axis at least in the locking condition of the locking device.

4. The objective lens mount according to claim 3, wherein the at least one spring of the force generating unit is a flexible spring that is configured to create a force applied on both the locking parts in the locking condition of the locking device.

5. The objective lens mount according to claim 3, wherein the locking device is switchable between the locking condition and a release condition by an operating element.

6. The objective lens mount according to claim 5, wherein the locking device is configured to allow mounting and removing of the connection device at or from the objective lens mount in the release condition and to block the mounting and removing of the connection device at or from the objective lens mount in the locking condition.

7. The objective lens mount according to claim 1, wherein individual ones of the locking parts of the locking device are moveably supported relative to the abutment part in a direction of the longitudinal axis.

8. The objective lens mount according to claim 1, wherein individual ones of the locking surfaces are formed by a cylindrical surface section of the respective locking part.

9. The objective lens mount according to claim 1, wherein the at least one positioning body pair includes a first positioning body pair that comprises the two first positioning bodies that are immoveable in an orthogonal or a radial direction with respect to the longitudinal axis.

10. The objective lens mount according to claim 9, wherein a biasing device is arranged opposite to the first positioning body pair with regard to the longitudinal axis and is configured to exert a radial force on the connection device.

11. The objective lens mount according to claim 10, wherein the biasing device comprises a second positioning body pair of the at least one positioning body pair with two second positioning bodies that are moveably supported against a biasing force in a direction orthogonal to the longitudinal axis.

12. The objective lens mount according to claim 1, wherein individual ones of the positioning bodies comprises a positioning sleeve that is rotatably supported about a respective rotation axis, wherein the surface of individual ones of the positioning sleeves comprises the positioning surface and wherein the respective rotation axis is oriented orthogonally with respect to the longitudinal axis.

13. The objective lens mount according to claim 1, wherein the abutment part is connected with a base body or base part and the at least one positioning body pair is arranged at the base body or the base part.

14. The objective lens mount according to claim 1, wherein the abutment part is connected with a base body or base part and is positionable relative to the base body or base part in a plane extending radially with respect to the longitudinal axis by an adjustment device.

15. The objective lens mount according to claim 14, wherein the adjustment device comprises one or more adjustment screws for positioning and fixing at least parts of the objective lens mount together with components connected therewith relative to the abutment part.

16. The objective lens mount according to claim 1, further comprising a mechanical coding device configured to define a relative rotation position range about the longitudinal axis between the objective lens mount and the connection device in which a connection between the at least one abutment surface and the at least one counter abutment surface can be established.

17. A connection device for an objective lens that is configured for exchangeably mounting the objective lens at an objective lens mount, the connection device comprising:
   at least one counter abutment surface that is provided at a connection ring and that is oriented orthogonally with respect to an optical axis of the objective lens and that is configured for planar abutment with an abutment surface of the objective lens mount respectively for defining an axial position of the connection ring relative to the objective lens mount,
   at least one counter positioning surface of the connection ring defined by a ring surface coaxially arranged about the optical axis and that is arranged at a distance to the optical axis of the objective lens and that faces away from the optical axis, wherein the at least one counter positioning surface is configured for one of a line-shaped abutment in a direction of the optical axis or a point-shaped abutment with one or more positioning surfaces of the objective lens mount for defining a radial position of the connection device relative to the objective lens mount,
   a counter rotation stop that is arranged at the connection ring and that is configured for abutment with a rotation stop of the objective lens mount for defining a relative rotation position of the connection device relative to the objective lens mount in a circumferential direction about the optical axis,
   two cylindrical counter locking parts that are arranged at a distance with respect to each other in the circumferential direction and at a distance with respect to the optical axis and that extend radially with respect to the optical axis, wherein individual ones of the counter locking parts comprise a counter locking surface that is configured for abutment with a locking surface of the objective lens mount.

18. The connection device according to claim 17, wherein the counter rotation stop extends radially outward from the connection ring.

19. An arrangement, comprising:
   an objective lens mount of an optical measuring device, and
   a connection device of an objective lens,
   wherein the objective lens mount is configured for exchangeably mounting a connection device of the objective lens,
   wherein the objective lens mount comprises at least one abutment surface that is provided at an abutment part and that is oriented orthogonally relative to a longitudinal axis of the objective lens mount and that is configured for abutment with at least one counter abutment surface of the connection device, in order to establish a plane-plane mating and to define an axial relative position of the connection device relative to the abutment part,
   wherein the objective lens mount comprises at least one positioning body pair that comprises two positioning bodies that are spaced apart from the longitudinal axis respectively and that each comprise a positioning surface facing the longitudinal axis and oriented obliquely with regard to each other in a radial plane that extends radially with respect to the longitudinal axis, wherein the positioning surface of each positioning body is configured for abutment with a counter positioning surface of the connection device, in order to establish a line-shaped contact in the direction of the longitudinal axis or a point-shaped contact, and to define a radial relative position of the connection device with regard to the objective lens mount,
   wherein the objective lens mount comprises a rotation stop that is configured for abutment with a counter rotation stop of the connection device in order to establish a line-shaped contact or point-shaped contact and to define a relative position of the connection device relative to the objective lens mount in a circumferential direction about the longitudinal axis,
   wherein the objective lens mount comprises a locking device comprising two locking parts spaced apart from each other in the circumferential direction and spaced apart from the longitudinal axis and each having a locking surface, wherein each locking surface is configured for abutment with a counter locking surface of the connection device,
   wherein the locking device is configured to create a force between the abutment part and the locking parts in a direction of the longitudinal axis in a locking condition in order to create a pressure force between the at least one abutment surface and the respective counter abutment surface, and
   wherein a means for creation of a pressing force in the circumferential direction between the rotation stop and the counter rotation stop is provided when a connection between the objective lens mount and the connection device is established, wherein the means for creation of a pressing force in the circumferential direction is defined by the locking surface or the counter locking surface that has an inclination in the circumferential direction.

\* \* \* \* \*